United States Patent
Jeremiah

(10) Patent No.: US 9,238,520 B2
(45) Date of Patent: Jan. 19, 2016

(54) CONTAINER AND VENDING MACHINE

(75) Inventor: Guy Jeremiah, London (GB)

(73) Assignee: Aquatina Limited, London (GB)

( * ) Notice: Subject to any disclaimer, the term of this patent is extended or adjusted under 35 U.S.C. 154(b) by 768 days.

(21) Appl. No.: 13/511,281

(22) PCT Filed: Oct. 29, 2010

(86) PCT No.: PCT/GB2010/002009
§ 371 (c)(1),
(2), (4) Date: May 22, 2012

(87) PCT Pub. No.: WO2011/064523
PCT Pub. Date: Jun. 3, 2011

(65) Prior Publication Data
US 2012/0227860 A1 Sep. 13, 2012

(30) Foreign Application Priority Data
Nov. 24, 2009 (GB) .................. 0920587.3

(51) Int. Cl.
| | | |
|---|---|---|
| B65B 1/30 | (2006.01) | |
| B65D 1/02 | (2006.01) | |
| B65D 1/32 | (2006.01) | |
| G06Q 20/32 | (2012.01) | |
| G07F 13/02 | (2006.01) | |
| G07G 1/00 | (2006.01) | |
| G06Q 20/34 | (2012.01) | |

(Continued)

(52) U.S. Cl.
CPC ................ *B65D 1/0292* (2013.01); *B65D 1/32* (2013.01); *G06Q 20/3278* (2013.01); *G06Q 20/352* (2013.01); *G07F 13/025* (2013.01); *G07G 1/0036* (2013.01); *B65D 11/18* (2013.01); *B65D 11/24* (2013.01); *B65D 2203/10* (2013.01)

(58) Field of Classification Search
CPC ........ B65D 11/18; B65D 11/24; B65D 37/00; B65D 40/02
USPC .......... 220/666, 669, 671, 672; 215/381, 382, 215/900; 141/94
See application file for complete search history.

(56) References Cited

U.S. PATENT DOCUMENTS

| | | | | |
|---|---|---|---|---|
| 3,301,293 A | * | 1/1967 | Santelli ........................ | 220/666 |
| 5,226,551 A | * | 7/1993 | Robbins, III ..................... | 220/8 |

(Continued)

FOREIGN PATENT DOCUMENTS

| | | |
|---|---|---|
| CA | 2 346 550 | 11/2002 |
| EP | 0 618 142 | 3/1994 |

(Continued)

OTHER PUBLICATIONS

International Search Report of PCT/GB2010/002009 dated Dec. 14, 2010.

(Continued)

*Primary Examiner* — Jason K Niesz
(74) *Attorney, Agent, or Firm* — Fay Sharpe LLP

(57) ABSTRACT

A collapsible container is made with a pair of upper and lower bellows sections connected by a rigid section with inwardly tapering ends, such that the container can be collapsed with the rigid section and the bellows sections overlapping. The collapsible container may be provided with an identifier such as an RFID tag which cooperates with a vending machine with a detector such as an RFID reader so as to dispense liquid into the container.

13 Claims, 12 Drawing Sheets

(51) Int. Cl.
 *B65D 6/16* (2006.01)
 *B65D 6/38* (2006.01)

(56) References Cited

U.S. PATENT DOCUMENTS

| | | | |
|---|---|---|---|
| 5,584,413 A * | 12/1996 | Jung | 220/666 |
| 6,662,964 B2 * | 12/2003 | Higuchi | 220/667 |
| 7,819,263 B1 * | 10/2010 | DiCarlo-Nelson | 215/11.3 |
| 7,866,500 B1 * | 1/2011 | Peggs | 220/6 |
| 2005/0017015 A1 * | 1/2005 | Higuchi | 220/666 |
| 2006/0016819 A1 | 1/2006 | Paslawski et al. | |
| 2007/0215239 A1 * | 9/2007 | Dorney | 141/94 |
| 2008/0257948 A1 | 10/2008 | Jochim et al. | |
| 2010/0024913 A1 | 2/2010 | Howard et al. | |

FOREIGN PATENT DOCUMENTS

| | | |
|---|---|---|
| FR | 2 607 109 | 11/1986 |
| JP | 09267845 | 10/1997 |
| JP | 2003081238 | 3/2003 |
| JP | 2007197042 | 8/2007 |
| JP | 2008186228 | 8/2008 |
| NL | 6812152 | 3/1970 |
| WO | WO 03/024814 | 3/2003 |
| WO | WO 2005/000702 | 1/2005 |

OTHER PUBLICATIONS

Search Report of GB 0920587.3 dated Mar. 11, 2010.
Amended Search Report of GB 0920587.3 dated Mar. 11, 2010.
Further Search Report of GB 0920587.2 dated Apr. 19, 2010.

* cited by examiner

CONTAINER AND VENDING MACHINE

This application relates to a collapsible container and a vending machine.

In particular the application relates to a collapsible container intended for storage of liquids such as drinks and intended to be re-filled from an associated vending machine.

In terms of collapsible containers, there is a considerable amount of prior art, both in known products and in the patent literature. For example, the following patent applications show containers with a concertina type design such that when empty (or only partially full) they can be folded in the longitudinal direction to a smaller size: WO00/43276, EP0287170; EP0733557.

One example of a collapsible container that is intended to be reused and is already on the market is the Easy Promote EP-301C-D Retractable Water Bottle which is a collapsible bottle of bellows type design with an external shell in the shape of two halves of a ball which folds in such a way that when the bottle is empty (or only partially full) it can be collapsed so that the two halves of the ball clip together. When full, the bottle extends so that the two halves separate and the bellows can be seen extending between the two halves.

One of the most significant problems with the prior art is the failure of the containers to stay collapsed after they have been folded down. Often the plastics are resilient and spring back to their extended position after being collapsed. Containers are more likely to stay collapsed, when each corrugation of the bellows is relatively long, extends more laterally than axially and is formed in a convex shape. However, further improvement to the ability of such containers to stay in either the expanded or collapsed position is desirable, and a way of maintaining the position of containers in which the structures have relatively short corrugations in the bellows sections is more strongly desired, since bottles with long bellows sections are complicated to manufacture, and by virtue of the long corrugations are not particularly efficient, taking up a relatively large space due to their overall dimensions, in relation to their internal volume. Another typical aim when manufacturing collapsible containers is to create one in which ratio of the space taken up by the container in the extended state to the space it takes up when collapsed is as high as possible.

It is very well known to have vending machines, which accept payment and then dispense various goods including water or other drinks. When water is dispensed from such machines, it is generally contained in a bottle made for example from PET. Although regarded by some as an urban myth, many people are concerned that reusing such water bottles can be a health risk because toxins can pass from the plastic container into the bottle. It is possible that bottle producers and drinks manufacturers/bottlers do not debunk the myth because it would damage sales or because they do not want to take responsibility for the purity of water from the taps of users. Whatever the reason, vending machines tend to sell water in bottles intended to be thrown away or recycled after drinking. This represents a waste of resources.

It is also known to provide water fountains in public areas which, at the press of a button, dispense cold water through a spout. However, such water fountains tend not to be coin operated, so the operators cannot make a profit from them. Finally, it is known to have machines which are provided with free plastic cups into which cool filtered water can be dispensed.

In one aspect of the invention, there is provided a container comprising a pair of bellows sections connected by a rigid section with inwardly tapering ends, whereby the container can be collapsed so that the rigid section and the bellows sections overlap.

With such an arrangement it is possible for the rigid section to maintain its configuration, while the bellows sections take up a different configuration in which they take up less room in the axial direction.

Preferably at least one bellows section is so configured that compressing the container causes the corrugations forming the bellows section to rotate relative to the rigid section such that they extend laterally from the rigid section.

Preferably each bellows section comprises corrugations which increase in width from the rigid section.

Preferably the container further comprises end caps which form a protective shell when the bellows sections are fully collapsed.

In a second aspect of the invention, there is provided a (preferably collapsible) container characterised by comprising an identifier for activating an associated vending machine such that the vending machine dispenses liquid into the container.

Such a container can thus be refilled at a suitable vending machine without the user needing to carry any other payment (for example coins, which may hamper certain users, such as joggers, who wish to carry as few items as possible). However, unlike water fountains which dispense free water, the provider of the associated vending machine is assured of a degree of income towards maintaining the provision of the machines from the sale of the containers themselves.

Preferably, the identifier is unique to the container to allow the use of a particular container to be tracked.

Preferably, the identifier is embedded in the container, for example in the base thereof.

Alternatively the identifier may be attached to the container by means of a fob.

Preferably, the identifier comprises an RFID tag. However, a mechanical key, or a machine readable code adapted to be read by a corresponding code reader on the vending machine or the like could be used.

Preferably the container comprises a pair of bellows sections connected by a rigid section with inwardly tapering ends, whereby the container can be collapsed so that the rigid section and the bellows sections overlap.

In a third aspect of the invention, there is provided a vending machine for vending a liquid comprising a spout through which liquid may be dispensed into a container and a detector for identifying an associated container and allowing liquid to be dispensed when an associated container is identified.

Preferably, the vending machine comprises means for connection to a computer network such that information on the number of uses of particular unique identifiers can be tracked.

Preferably, the vending machine comprises means for accepting payment, such that the unique identifier may be used as an account and credited to allow further refills.

Preferably the liquid is water, but optionally other liquids such as isotonic sports drinks or soft drinks could be dispensed. An advantage of water is a ready supply through the mains, or springs, that does not require any special treatment such as cooling, or to be manually topped up.

These and further preferred features may be better understood by reading the following description of one particular non-limiting exemplary embodiment of the invention, with reference to the accompanying drawings, in which.

Referring to FIGS. 1 to 4, the container 101 comprises a base cap 102 and top cap 103 with a collapsible bellows section 104 extending therebetween. The base cap 102 and top cap 103 are suitably formed by injection moulding polythene and are suitably cup shaped with a diameter of around 100 mm, a height of about 10-20 mm and a thickness of 1-2 mm; they provide a rigid shell when the bellows section 104 is collapsed.

Figure 1:
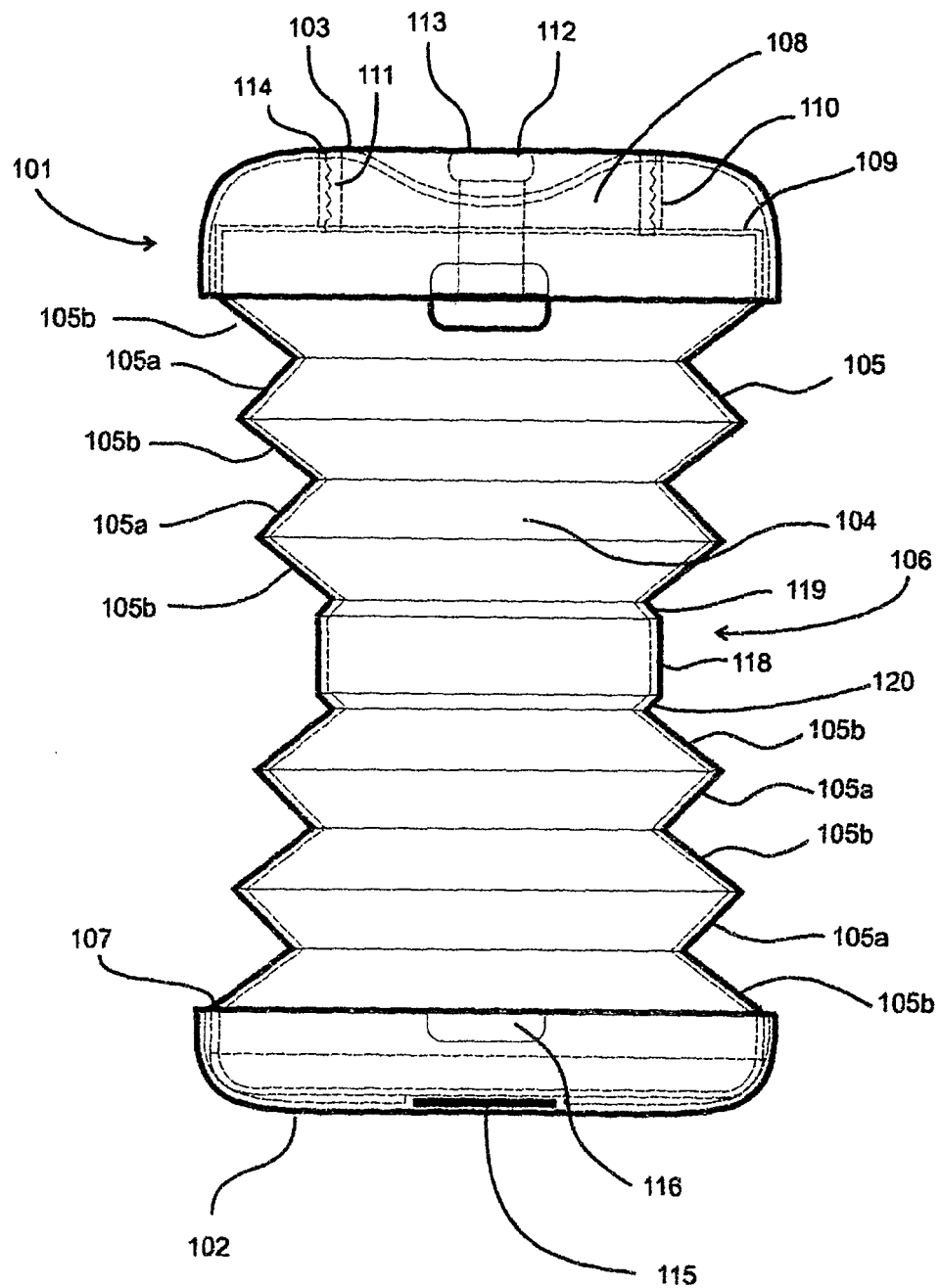
FIG. 1 shows a side view of a collapsible container in the extended state, with hidden detail shown by dotted lines.

The bellows section 104 is formed of a plurality of frustoconical corrugations 105 and a rigid central section 106 is situated midway between the base cap 102 and top cap 103. The rigid central section 106 is made up of a central cylindrical section 120 with inwardly tapering ends 118, 119, which in this embodiment each have a frustoconical shape. As best seen in FIG. 1, in its fully extended state, the container is generally hourglass shaped, with the diameters of each of the frustoconical corrugations 105 gradually decreasing towards the central section 106, such that the edge of each of the inwardly tapering ends 118, 119 of the rigid central section 106 is connected to the inside edge of the smallest diameter of the smallest corrugation 105. In this example, there are five frustoconical corrugations 105 either side of the rigid central section 106, each having a height of around 10 mm.

Beneath the lowermost corrugation 105, the bellows portion is provided with a base 107 which fits snugly into the base cap 102 and is affixed thereto, for example by gluing or a plastic weld. On the other hand, a mouth 108 is provided at the upper end of the bellows section 104, above the uppermost corrugation 105. In this embodiment, the mouth is not as wide as the uppermost corrugation 105, so an annular surface 109 extends inwardly from the uppermost corrugation 105 to the open mouth 108. A cylindrical threaded portion 110 extends (upwardly) from the inner edge of the annular surface 109 and can be screwed into an associated thread 111 formed in the top cap.

In addition to the mouth 108 which can be opened by unscrewing the top cap 103 and closed by screwing the top cap 103 on, so as to allow the container 101 to be filled and emptied, the top cap 103 is also provided with a nozzle 112 (in this case at the centre of the top cap 103) which can be opened for example by pulling it out from a position where its upper surface 113 is in the same plane as the upper surface 114 of the top cap 103, so as to open a valve and allow fluid to flow out of the container 101.

The container 101 also includes a fastener 116, such as a catch/latch arrangement for keeping the base cap 102 and top cap 103 together when the bellows section 104 is collapsed, and an identifier 115 in the form of an RFID chip which in this case is embedded in the base cap, although it would be possible for it to be otherwise attached to the container, for example on a lanyard. The purpose of the identifier will become apparent later.

As mentioned above, the bellows section 104 includes a plurality of frustoconical corrugations 105. Each corrugation 105 is joined to an adjacent corrugation at their circumferential edges. Likewise, the smaller circumferential edge of each of the corrugations adjacent the rigid central section 106 is joined thereto in the region of one of its circumferential edges. The joins act as pivots, about which the corrugations can fold. The inwardly tapering ends 118, 119 improve the ability of the corrugations 105 either side thereof to remain in the folded position and not snap back to the extended configuration.

Figure 2:
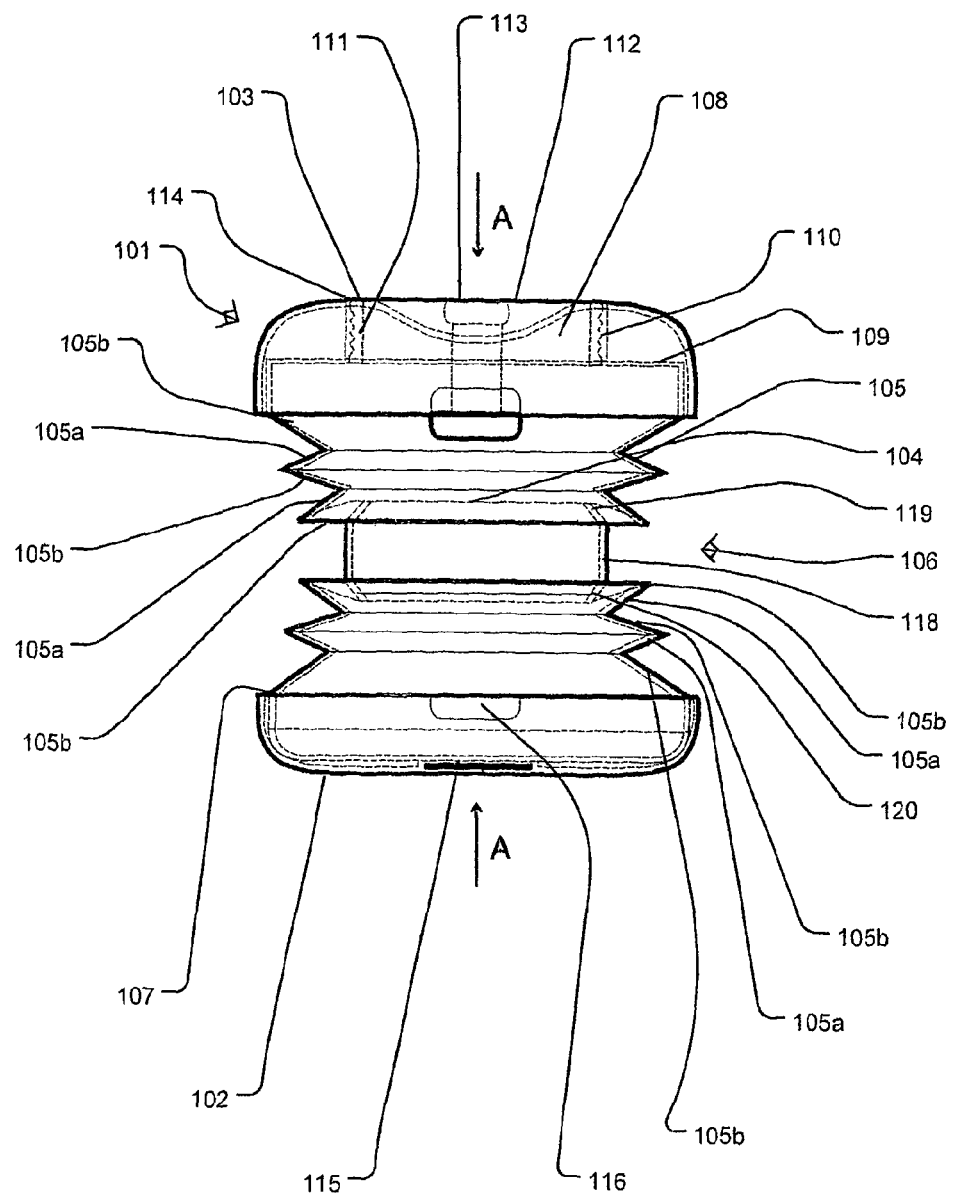
FIG. 2 shows a side view of the collapsible container of FIG. 1 in a half collapsed state, with hidden detail shown by dotted lines.

FIG. 2 shows the folding of the bellows section 104 when a compressive force (in direction A) is applied to urge the top cap 103 and bottom cap 102 towards one another. As can be seen in the drawing, the corrugations 105 adjacent the central section 106 are folded such that they overlap outside the central section 106 and inside the frustoconical corrugation joined to the larger of their circumferential edges. (It is not shown in the drawing, but fluid, such as air in the container should be allowed to escape during this process, for example by opening the nozzle.)

Figure 3:
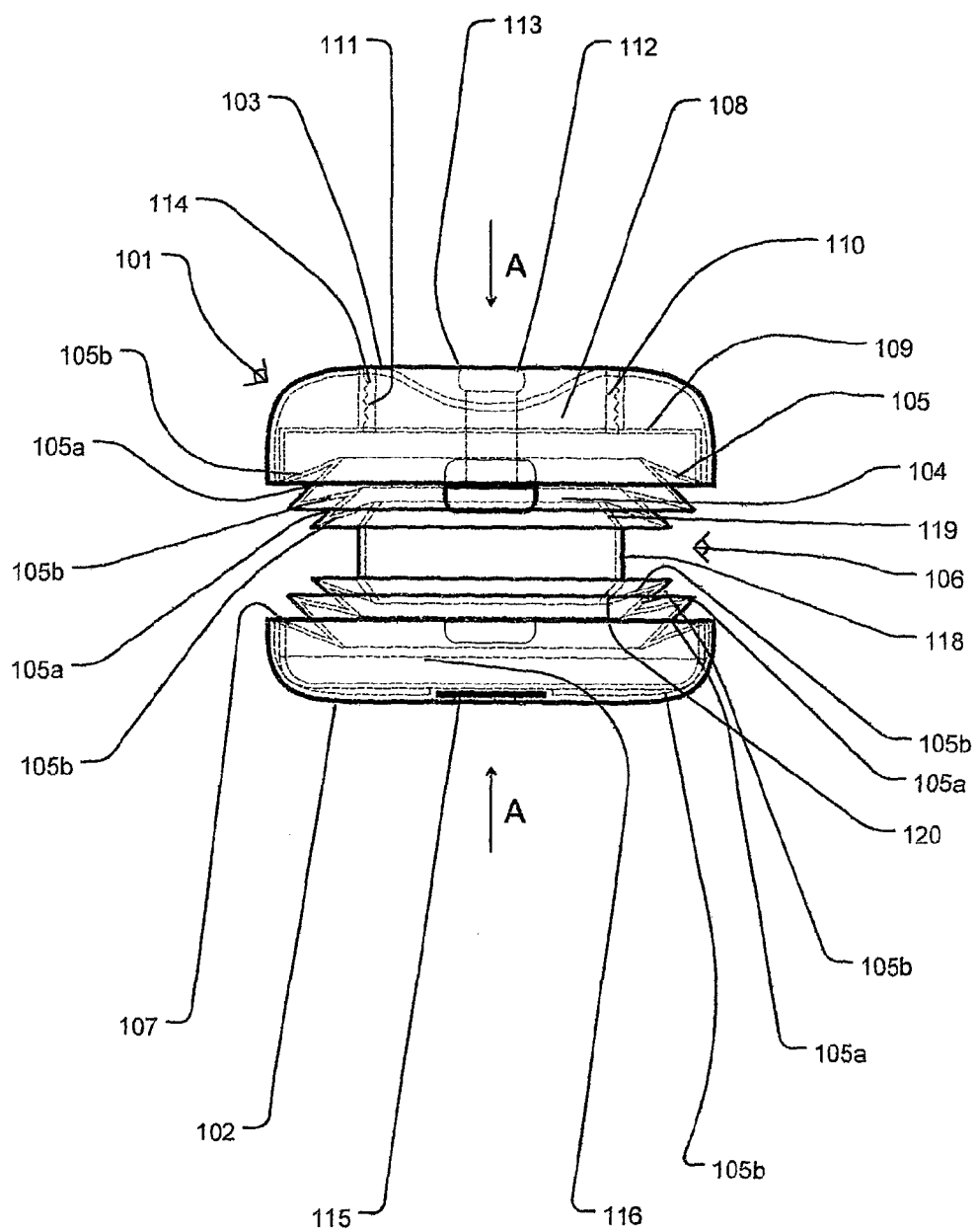
FIG. 3 shows a more collapsed state of the collapsible container shown in FIGS. 1 and 2, with hidden detail shown by dotted lines.

FIG. 3 shows a step further in the compression (in the direction A) of the container 101, with all of the corrugations 105 folded. In the drawing, it can be seen that one can consider the corrugations to be split into two types:

a) those that (roughly) maintain their position during initial folding i.e. the outwardly downwardly sloping corrugations 105a in the top bellows section (the part between the central section 106 and the top cap 103) and the upwardly outwardly sloping corrugations 105a in the bottom bellows section (the part between the rigid central section 106 and the base cap 102); and b) those whose position is rotated during the folding process, i.e. when the bottle is fully extended as shown in FIG. 1, the inwardly downwardly sloping corrugations 105b in the top bellows section, and the inwardly upwardly sloping corrugations 105b in the bottom bellows section In FIG. 3 it can be seen that all of the "type b" corrugations have been rotated, so that instead of being roughly perpendicular to the adjacent "type a" corrugations, they are closer to parallel with them.

Figure 4:
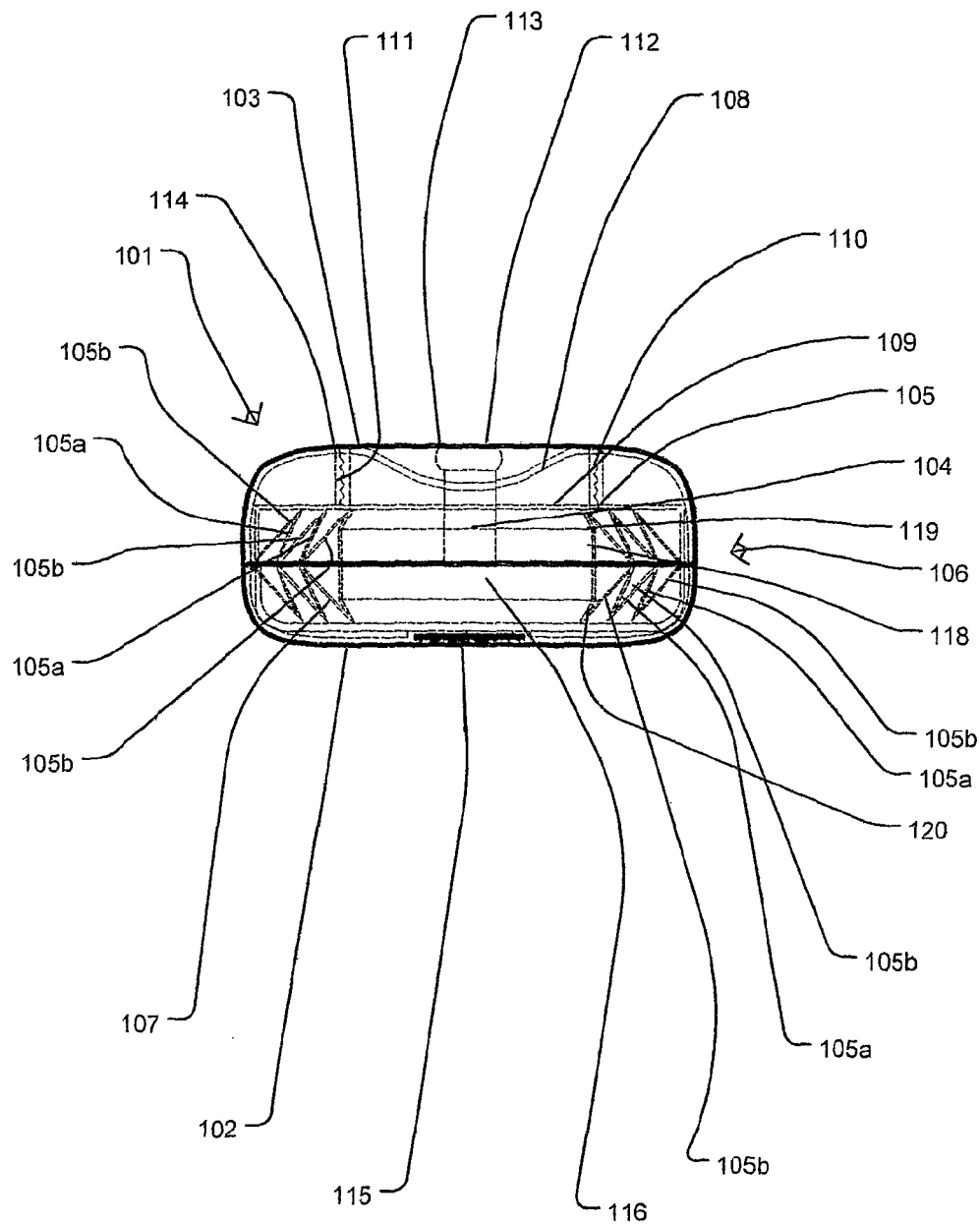
FIG. 4 shows the collapsible container of FIGS. 1 to 3 in a fully collapsed state.

FIG. 4 shows a final step in the folding process, whereby both the "type b" and "type a" corrugations are rotated from the roughly horizontal position shown in FIG. 3 where they are roughly parallel with the top and bottom caps 102, 103, to a roughly vertical position, whereby they become closer to parallel with the axis of the central cylindrical section 120.

This final folding action which takes place due to the provision of the rigid central section 106 and the hourglass shape leads to the small size of the collapsed container when compared to the container as shown in FIG. 3. Once this final step has been taken, it can be seen that the top edge of the base cap 102 and the bottom edge of the top cap 103 are adjacent one another, such that the caps provide a shell, protecting the more delicate bellows section 104 within. The shells are kept in this position by ensuring the nozzle 112 and mouth 108 are closed so no air can get into the container and relying on pressure and by means of the fastener 116.

As an alternative to the provision of frustoconical corrugations 105, it may be possible to use two helicoidal surfaces, one between the rigid central section 106 and the top cap 103 and the other between the central section 106 and the base cap 102. However, to allow the completely collapsed container 101 to be small due to the roughly vertical alignment in the folded state, the same hourglass shape is necessary, so the helicoid should be based on a conical helix.

Figure 5:
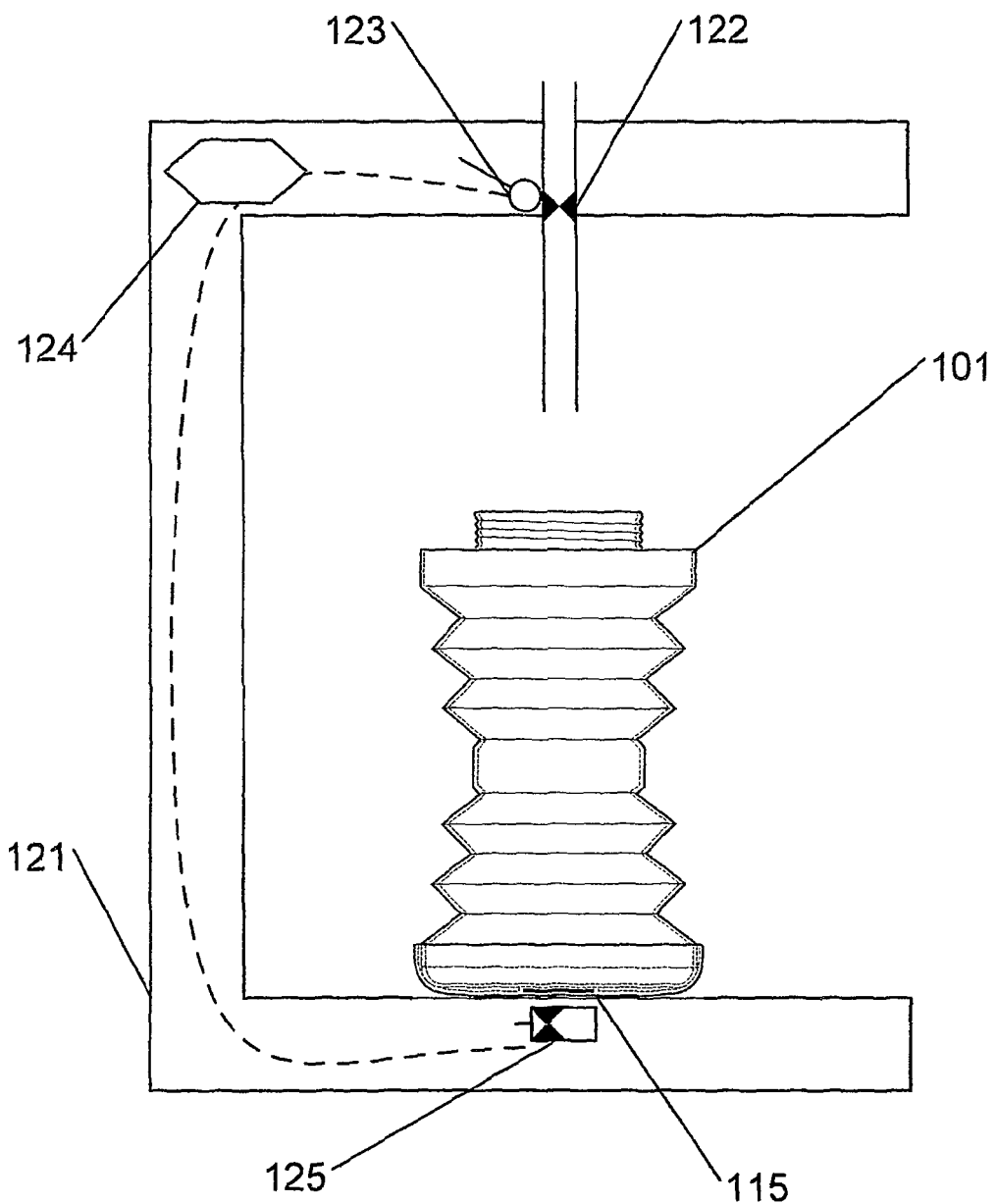
FIG. 5 shows a schematic diagram of a vending machine with a collapsible container as shown in FIGS. 1-4.

In order to fill the container 101 a vending machine 121 as shown in FIG. 5 may be used. As shown in the drawing, the top cap 103 is removed from the container 101 before it is placed in the vending machine, so as to open the mouth of the container. The container is placed beneath an electrically operated spout 122 through which mains water can flow. An electrical switch 123 is provided to start and end the flow of water through the spout 122 and is operated by a microprocessor 124. The microprocessor is connected to a detector in the form of an RFID chip reader 125 which detects the presence of the identifier 115 associated with the container.

It would be possible to also provide an additional user operated switch, in order that the flow of water could be regulated by a user to only partially fill a container 101. This could also be useful if containers 101 of different sizes were to be used. However, it is preferable for the detector 125 to identify the size of the container based on information in the identifier 115 and for the microprocessor 124 to control flow in accordance with the available volume.

In the case where the identifier 115 is in a particular place on the container 101 it is possible for the detector 125 to positively identify when the container 101 is in the correct position to allow dispensing to begin (and indeed to identify when the container 101 is moved such that the microprocessor 124 can stop flow of water). However, the provision of a user operated switch, would also be of benefit where the identifier 115 is carried on a lanyard or the like, because in this case, positive discrimination of the precise position of the container 101 would be difficult, or at least less accurate. In this case, the user operated switch could be wired in series with the detector 125, or the microprocessor 124 could function such that the presence of a container 101 must be detected and the user operated switch activated before water is dispensed through the spout 122.

The microprocessor may also be connected to a computer network such that information on the number of uses of particular unique identifiers can be tracked and the vending machine 121 could also include means for accepting payment, such that the identifier 115 may be used as an account and credited to allow further refills.

Figure 6:
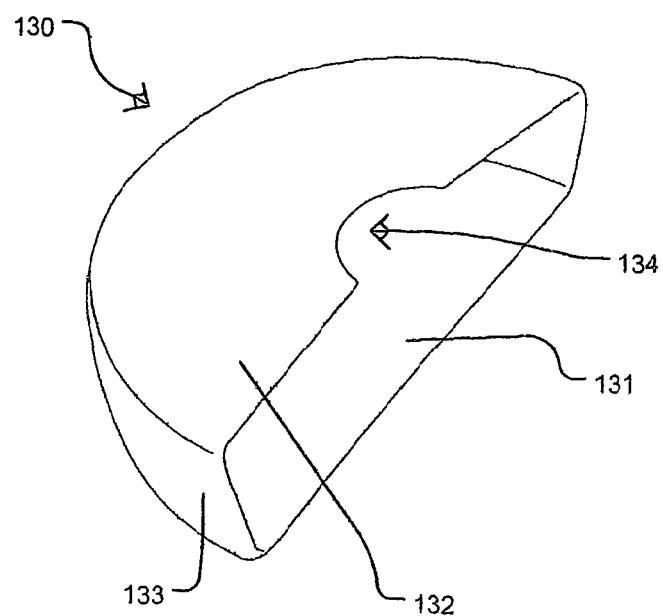
FIG. 6 shows a perspective view of a collapsible container in combination with a first embodiment of a protective sheath.
Figure 7:
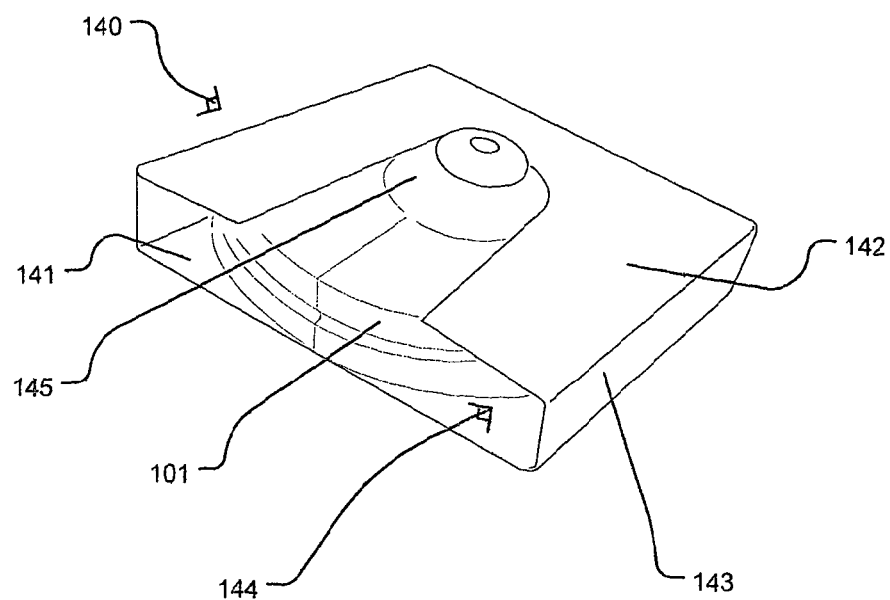
FIG. 7 shows a perspective view of a collapsible container in combination with a second embodiment of a protective sheath.
Figure 8:
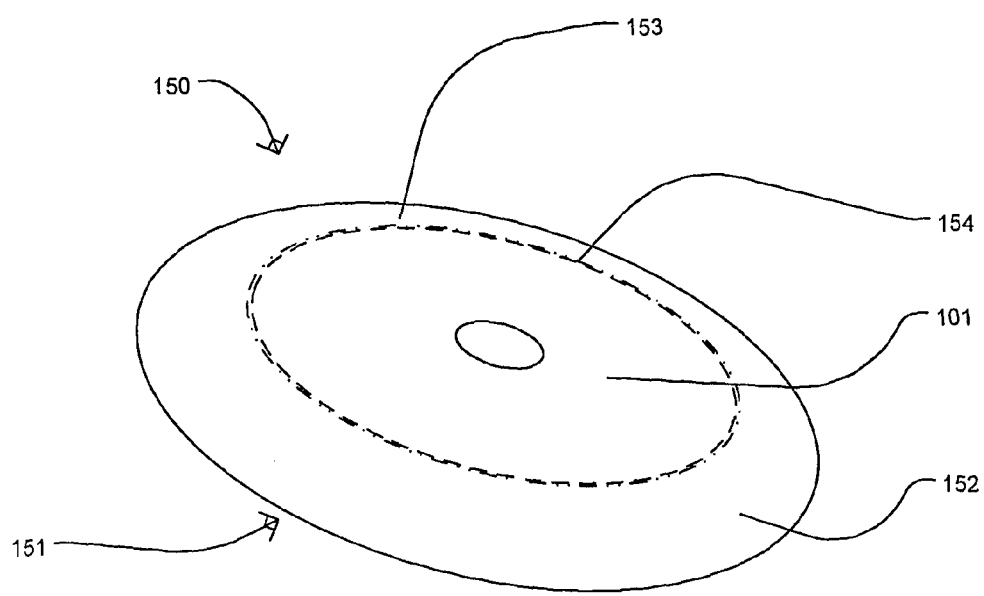
FIG. 8 shows a perspective view of a collapsible container in combination with a third embodiment of a protective sheath.
Figure 9:
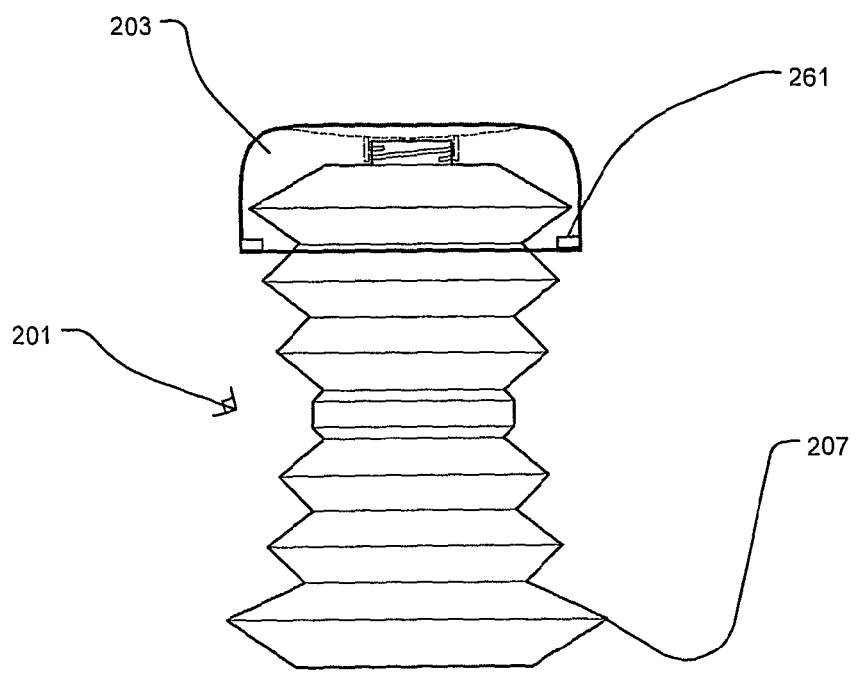
FIG. 9 shows a side view of an alternative embodiment of a collapsible container in an extended state.
Figure 10:
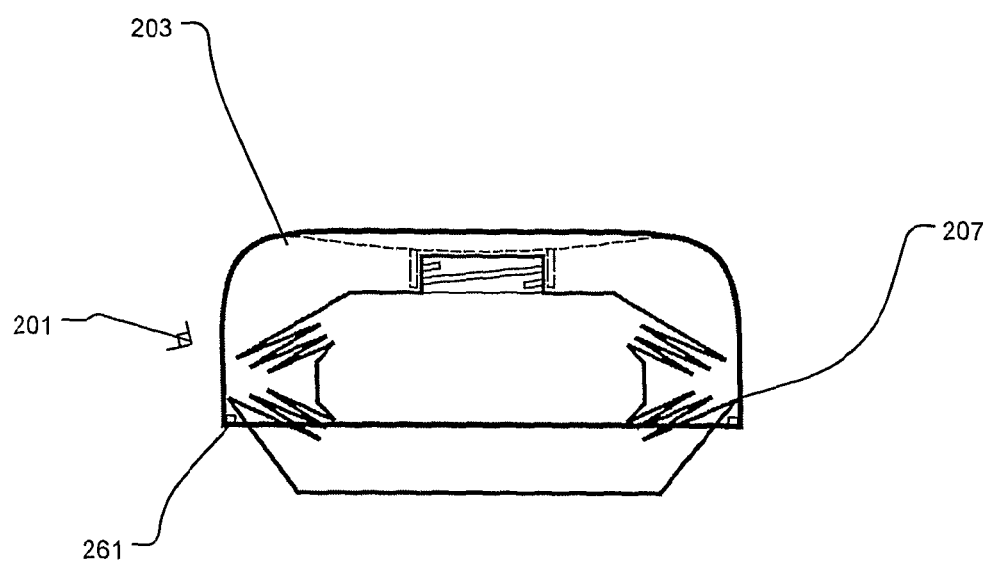
FIG. 10 shows a side view of the collapsible container of FIG. 9 in a collapsed state.

Instead, or in addition to the base cap 102 and top cap 103 a protective sheath can be used with the container and embodiments of such sheaths are shown in FIGS. 6-8. FIG. 6 shows a sheath 130 of generally semicircular shape, which is made up of a semicircular back sheet 131 and a semicircular front sheet 132, joined at their edges by a web 133. The sheath 130 is sized to accommodate the container 101 and the front sheet 132 has a notch or cutaway 134 to allow for the extension in the axial direction of the nozzle 112, which would not necessarily be in the same plane as with the top of the container 101 if a separate top cap 101 were not provided.

FIG. 7 shows an alternative generally square sheath 140 which is formed of a square back sheet 141, a square front sheet 142 and a web 143 joining the front and back sheets 141, 142 on three of their sides, so as to leave an opening 144 into which the container 101 can be slid. The top sheet also has a cutaway 145 to allow for the nozzle to extend through the sheath.

FIG. 8 shows another alternative sheath 150, which is formed of fabric shaped to have a circular back sheet 151 and a webbing 152 which extends round the outer circumference of the compressed container 101 to an annular front sheet 153, the inside edge of which 154 is elasticated to allow the container to be inserted into the central opening.

All of these sheaths 130, 140, 150 serve two purposes, firstly protecting the delicate corrugations from ingress of dirt or other detritus and impact, and secondly giving a surface onto which advertising material or the like can be easily applied. As a particular example of useful information that could be applied to such a sheath, they could be printed with a map showing the locations of suitable vending machines 121 at which the container 101 can be filled.

Figure 11:
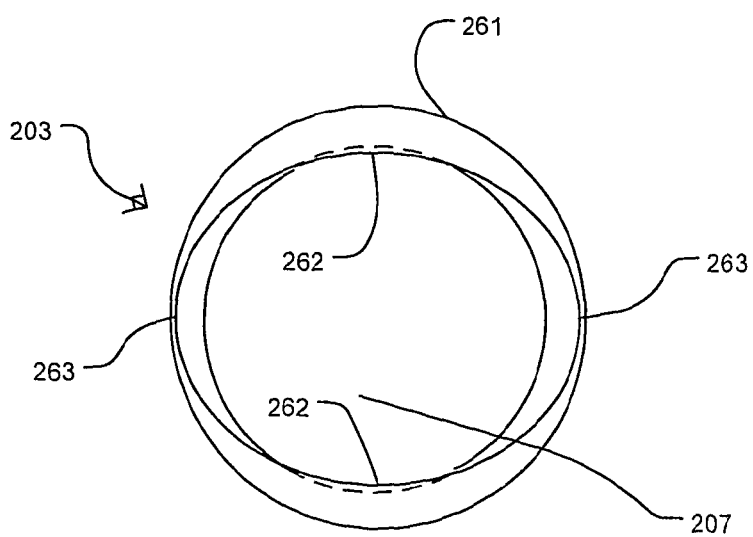
FIG. 11 shows an underneath view of the collapsible container of FIG. 9 retained in the collapsed state.
Figure 12:
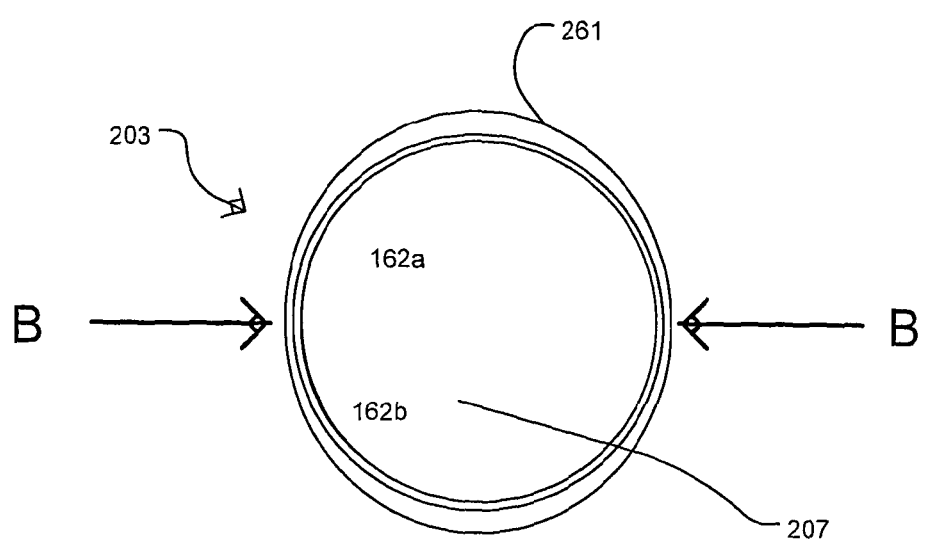
FIG. 12 also shows an underneath view of the collapsible container of FIG. 9 in the collapsed state.

Referring to FIGS. 9 to 12, an alternative embodiment of a container 201 is shown, in which there is no bottom cap, and the top cap 203 is formed so as to hold the container 201 in the collapsed state. Most of the features of the first container 101 are also found in the second container, so only the important differences will be described. As mentioned above, the major difference can be found in the formation of the top cap, which has a lip 261 extending inwards from the lower edge of the circular top cap 203, so as to form an oval opening, as best seen in FIG. 11. This oval opening formed by the inwardly extending lip 261 is formed so as to be narrower at its narrowest point 262, than the widest part of the base 207, however, at its widest point 263, the oval opening is wider than the widest part of the base 207 and by pushing the widest part 263 inward as indicated by the arrows labelled B in FIG. 12, it is possible to push the widest part of the base through the oval opening formed by the lip 261 in the top cap 203. Once the squeezing force in the direction B is released, the top cap returns to its original shape and the outer edge of the base 207 overlaps the inner edge of the lip 261, so as to retain the container in the collapsed condition.

The invention claimed is:

1. A collapsible container comprising a pair of bellows sections connected by a rigid section with inwardly tapering ends, whereby the container can be collapsed so that the rigid section and the bellows sections overlap wherein each bellows section comprises corrugations which increase in width from the rigid section, such that in an extended state the container is hourglass shaped, with the diameters of each of the corrugations gradually decreasing towards the rigid section.

2. A collapsible container according to claim 1 wherein at least one bellows section is so configured that compressing the container causes the corrugations forming the bellows section to rotate relative to the rigid section such that they extend laterally from the rigid section.

3. A collapsible container according to claim 1 further comprising end caps which form a protective shell when the bellows sections are fully collapsed.

4. A collapsible container according to claim 1 further comprising an end cap including an inwardly extending lip which can be manipulated to retain the container in a collapsed position.

5. A collapsible container according to claim 4 wherein the inwardly extending lip defines an oval opening.

6. A container according to claim 1 comprising an identifier for activating an associated vending machine such that the vending machine dispenses liquid into the container.

7. A container according to claim 6 wherein the identifier is unique to the container to allow the use of any particular container to be tracked.

8. A container according to claim 6 wherein the identifier is embedded in the container.

9. A container according to claim 6 wherein the identifier is attached to the container by means of a fob.

10. A container according to claim 6 wherein the identifier comprises an RFID tag.

11. A kit comprising a vending machine for vending a liquid and at least one container; wherein the vending machine comprises a spout through which liquid may be dispensed into the at least one container and a detector for identifying the at least one container and allowing liquid to be dispensed when the at least one container is identified; and wherein the at least one container is a container according to claim 6.

12. A kit according to claim 11 wherein the vending machine further comprises means for connection to a computer network such that information on the number of uses of particular unique identifiers can be tracked.

13. A kit according to claim 11 wherein the vending machine further comprises means for accepting payment, such that the unique identifier may be used as an account and credited to allow further refills.

* * * * *